US008521647B2

(12) United States Patent
Rothfarb

(10) Patent No.: US 8,521,647 B2
(45) Date of Patent: *Aug. 27, 2013

(54) LOCK-AND-KEY CONSUMER BILLING DATA PROTECTION FOR TELEMARKETING

(75) Inventor: Neil Barry Rothfarb, West Hartford, CT (US)

(73) Assignee: Nebard Software Foundation L.L.C., Wilmington, DE (US)

( * ) Notice: Subject to any disclaimer, the term of this patent is extended or adjusted under 35 U.S.C. 154(b) by 2973 days.

This patent is subject to a terminal disclaimer.

(21) Appl. No.: 10/107,863

(22) Filed: Mar. 26, 2002

(65) Prior Publication Data

US 2003/0187788 A1 Oct. 2, 2003

(51) Int. Cl.
*G06F 17/00* (2006.01)

(52) U.S. Cl.
USPC ............. 705/40; 705/67; 235/380; 726/9

(58) Field of Classification Search
USPC .............. 705/14, 50–80, 26, 39–41, 44
See application file for complete search history.

(56) References Cited

U.S. PATENT DOCUMENTS

| 4,123,747 | A | 10/1978 | Lancto |
|---|---|---|---|
| 5,590,197 | A | 12/1996 | Chen et al. |
| 5,706,442 | A | 1/1998 | Anderson |
| 5,748,718 | A | 5/1998 | Manicone |
| 5,960,411 | A | 9/1999 | Hartman |
| 6,128,603 | A | 10/2000 | Dent |
| 6,408,284 | B1 | 6/2002 | Hilt |
| 6,676,016 | B1 | 1/2004 | Coskrey, IV |
| 6,839,687 | B1 | 1/2005 | Dent |
| 6,868,403 | B1 | 3/2005 | Wiser |
| 7,043,452 | B2 | 5/2006 | Rothfarb |
| 2002/0184089 | A1* | 12/2002 | Tsou et al. ............... 705/14 |
| 2003/0216980 | A1 | 11/2003 | Rothfarb |
| 2003/0216999 | A1 | 11/2003 | Rothfarb |
| 2005/0065883 | A1 | 3/2005 | Dent |
| 2005/0080736 | A1 | 4/2005 | Dent |

(Continued)

FOREIGN PATENT DOCUMENTS

JP 363316626 A 12/1988

OTHER PUBLICATIONS

U.S. Government Federal Trade Commission, "18 CFR Part 310, Telemarketing Sales Rule, Proposed Rule," Federal Register, vol. 87, No. 20, Part II, FR Doc. Feb. 1998 Filed Jan. 29, 2002; 8:45 a.m., Jan. 30, 2002, pp. 4492-4546.

(Continued)

*Primary Examiner* — Calvin L Hewitt, II
*Assistant Examiner* — John M Winter

(57) ABSTRACT

A "lock-and-key" consumer billing data protection capability is provided to telemarketing systems which are based upon previously-acquired consumer lists. The lists contain only partial billing information for each consumer, which is insufficient to access the consumer's account. Thus, at the time a telemarketer employing this capability communicates with a consumer to offer them a product or service, the telemarketer, the seller and any entity hired to perform billing operations for such consumer purchases all remain "locked" out from accessing the consumer's account. When the consumer wishes to authorize the purchase of an offered product or service, the consumer must "reach into their wallet" to provide the "key" to their account, which is the missing billing information not acquired from the third-party list provider.

23 Claims, 4 Drawing Sheets

(56) References Cited

U.S. PATENT DOCUMENTS

| | | | |
|---|---|---|---|
| 2006/0129835 A1* | 6/2006 | Ellmore | 713/183 |
| 2007/0005427 A1* | 1/2007 | Walker et al. | 705/14 |
| 2008/0147564 A1* | 6/2008 | Singhal | 705/67 |

OTHER PUBLICATIONS

"The Bank Credit Card Business," 2d ed., American Bankers Association, Washington, D.C., 1996, 243 pages.

"Borland® Paradox® for Windows: Users Guide," Version 5.0, Borland International, Inc., Scotts Valley, Calif., 1994, 188 pages.

Bragg, S. M., "Accounting Best Practices," Wiley, New York, 1999, 290 pages.

Chopra, S., and P. Meindl, "Supply Chain Management: Strategy, Planning, & Operation," Prentice-Hall, Upper Saddle River, N.J., Oct. 10, 2000, 459 pages.

Danish, S., and P. Gannon, "Building Database-Driven Web Catalogs," McGraw-Hill, New York, 1998, 263 pages.

Derfler, Jr., F. J., and L. Freed, "How Networks Work," Millennium Edition, Que Corporation, Indianapolis, Sep. 2000, 230 pages.

Dobler, D. W., and D. N. Burt, "Purchasing and Supply Management: Text and Cases," 6th ed., McGraw-Hill, New York, 1996, 806 pages.

Gavron, J., and J. Moran, "How to Use Microsoft Windows NT 4 Workstation," Macmillan Computer Publishing, Emeryville, Calif., 1996, 198 pages.

Gralla, P., "How the Internet Works," 6th ed., Que Corporation, Indianapolis, Sep. 7, 2001, 354 pages.

Muller, N. J., "Desktop Encyclopedia of the Internet," Artech House, Norwood, Mass., Nov. 1998, 566 pages.

"Restatement of the Law, Second (Student Edition): Contracts 2d, Pamphlet 1 §§ 1-177, With Reporter's Notes," American Law Institute, St. Paul, Minn., 1981, pp. I-XXIV, 1-243.

Riley, D. D., "Data Abstraction and Structures: An Introduction to Computer Science II," Boyd & Fraser Publishing, Boston, 1987, pp. v-xviii, 1-3, 653-662.

White, J. J., and R. S. Summers, "Uniform Commercial Code," 4th ed., West Publishing Co., St. Paul, Minn., 1995, pp. xxv-xxix, 1019-1043.

White, R., "How Computers Work," Millennium Edition, Que Corporation, Indianapolis, Sep. 1999, 284 pages.

Rothfarb, N.B., "Lock-and-Key Consumer Billing Data Protection System Having Data Encryption Capability," U.S. Appl. No. 12/118,663, filed May 9, 2008, a reissue application of U.S. Appl. No. 10/160,765, filed May 31, 2002, now U.S. Patent No. 7043452, which is a Continuation-in-Part of the present application.

Restriction Requirement dated Sep. 19, 2005, from U.S. Appl. No. 10/146,249, filed May 15, 2002.

Office Action dated Jan. 31, 2006, from U.S. Appl. No. 10/146,249, filed May 15, 2002.

Final Office Action dated Jul. 19, 2006, from U.S. Appl. No. 10/146,249, filed May 15, 2002.

Board of Appeals Decision dated Sep. 22, 2008, from U.S. Appl. No. 10/146,249, filed May 15, 2002.

Restriction Requirement dated Aug. 23, 2007, from U.S. Appl. No. 10/146,252, filed May 15, 2002.

Office Action dated Dec. 13, 2007, from U.S. Appl. No. 10/146,252, filed May 15, 2002.

Final Office Action dated Jun. 27, 2008, from U.S. Appl. No. 10/146,252, filed May 15, 2002.

Office Action dated Apr. 6, 2005, from U.S. Appl. No. 10/160,765, filed May 31, 2002, now U.S. Patent No. 7,043,452, which is a Continuation-in-Part of the present application.

Notice of Allowance dated Dec. 7, 2005, from U.S. Appl. No. 10/160,765, filed May 31, 2002, now U.S. Patent No. 7,043,452.

* cited by examiner

LOCK-AND-KEY CONSUMER BILLING DATA PROTECTION FOR TELEMARKETING

FIELD OF THE INVENTION

The present invention relates generally to computer systems, and more particularly to computerized order entry systems that support and facilitate consumer telemarketing operations.

RELATED ART

The practice of companies offering to sell goods or services to consumers directly over the telephone, without requiring the consumer to visit a traditional ("bricks and mortar") store, is known as telemarketing. In today's business climate, telemarketing has become ubiquitous. For example, in the United States, telemarketing currently accounts for more than $1 trillion in annual sales. This represents approximately 14% of American consumers' annual retail spending.

Historically, one of the primary problems with telemarketing was that telemarketers did not precisely target consumers who were likely to buy their products or services. Rather, telemarketers routinely employed "cold calls" in an attempt to reach a broad range of consumers. These "cold calls" were attempted without regard for which consumers were most likely to be receptive to the particular products and/or services being offered by the telemarketers. That is, these "cold calls" employed no market intelligence (e.g., demographic data, etc.) in targeting consumers who were to receive such calls. In fact, many telemarketers employed computer-based systems that simply dialed telephone numbers randomly.

Recently, however, telemarketers have recognized that consumers and the companies providing the goods and services which they market and sell would all benefit from targeted telemarketing. Accordingly, telemarketers have begun to target their efforts to those consumers who most likely would be receptive to the specific products and/or services being offered. Specifically, a telemarketing company attempting to sell a product or service of one of its clients may acquire from a third-party a list of consumers who recently purchased related products or services. For example, a telemarketing company attempting to sell memberships in a dial-in roadside assistance service program may acquire a recent consumer list from a third-party vendor of car telephones.

Even when a consumer agrees to purchase a product or service offered by a telemarketing company, in order to access that consumer's account (i.e. bill that consumer), it is necessary to possess certain "billing information." At a minimum, this billing information includes the entire number, typically sixteen digits, of the consumer's credit or debit card. The same billing information is required regardless of whether the entity accessing the consumer's account is the telemarketing company itself, the seller, or any other entity hired to perform the billing operations.

There are two general approaches currently employed to acquire this billing information necessary to access a consumer's account.

The first approach is to acquire all of a consumer's billing information from the third party that provided the consumer list being used by the telemarketing company. Under this approach, a consumer's billing information is often acquired from the third-party list provider before the telemarketing company calls that consumer. Variations on this approach include acquiring a consumer's billing information only after the telemarketing company calls the consumer and verifies that the consumer wants to purchase the offered product or service with the same credit or debit card used for the prior purchase (commonly referred to as a "matchback"). Under the variations of this approach, however, all of the consumer's billing information is ultimately acquired from the third-party list provider—consumers do not need to provide any billing information themselves.

The advantage of this approach is that it eliminates the need for consumers to recite their credit or debit card number over the telephone. This protects consumers from reciting billing information sufficient to access their account to untrustworthy telephone sales agents employed by legitimate telemarketers and fraudulent persons posing as legitimate telemarketers. The disadvantage of this approach, however, is that consumers are not in control of their billing information. As long as a telemarketing company professes to have interpreted some response from a consumer as authorizing a purchase, the consumer's account can be charged. This charge can take place even if the consumer was confused by the telemarketing script and simply said "yes" in response to a question (perhaps thinking it would make an aggressive telemarketer go away), but did not actually intend to purchase the offered product or service. Thus, even if a telemarketer erroneously believes there has been authorization during a particular telephone conversation, the telemarketer is able to bill the consumer easily and without hesitation.

The second approach is to acquire all of a consumer's billing information directly from the consumer. If a consumer wants to accept a telemarketing offer to purchase a product or service, that consumer must then recite their entire credit or debit card number to the sales agent.

The advantage of this approach is that consumers are in control of their billing information. Without a consumer's credit or debit card number, the telemarketer cannot bill consumers in those situations where they erroneously believe there has been authorization. The disadvantage of this approach, however, is that consumers must recite all of their billing information over the telephone. Consequently, consumers may recite billing information sufficient to access their account to untrustworthy sales agents employed by legitimate telemarketers and/or fraudulent persons posing as telemarketers. In addition, this approach produces billing mistakes due to errors in the transmission and communication of the consumers' billing information to the sales agent. Finally, from the telemarketers' perspective, this approach is not desirable because consumers are disinclined to recite their entire credit or debit card number over the telephone.

Therefore, given the above, what is needed is a lock-and-key consumer billing data protection capability for telemarketing systems that combines some or all of the advantages of the above-described approaches, while eliminating or reducing some or all of their respective disadvantages.

SUMMARY OF THE INVENTION

The present lock-and-key consumer billing data protection system provides customer billing account security to telemarketing systems that are based upon consumer lists which may be acquired from third-party companies.

The lock-and-key consumer billing data protection system, in one embodiment, includes a telemarketing database that stores consumer records acquired from third-parties from whom such consumers have previously purchased goods or services. Each stored record includes consumer identification information and partial billing information. Because there is only partial billing information (fewer than all of the alphanumeric characters needed to access a consumer's account)

acquired from the third party, the telemarketer, the seller, and companies hired to perform billing operations are "locked" out of every consumer's account. Further, a telemarketing server allows the sales agents employed by the telemarketing company and utilizing the telemarketing system to only access the consumer identification information stored in the consumer records. That is, the server bars their access to even the partial billing information stored in the consumer record.

If a sales agent indicates to the telemarketing server that a consumer wishes to purchase a product or service being offered, the telemarketing server prompts the sales agent to ask the consumer for the "key" to the consumers account, which is the missing billing information not yet stored in the telemarketing database. Only after the consumer gives the sales agent that "key" and the sales agent enters it into the telemarketing system, can the consumer be charged. Specifically, now that all the consumer's billing information has been acquired—partly from the third-party list provider and partly from the consumer—can the consumer's account can be accessed by the telemarketer, the seller, or an entity hired to perform billing operations for such purchases.

One advantage of lock-and-key consumer billing data protection is that consumers are in control of their billing information. Without receiving the missing billing information (the "key") from the consumer, no entity can bill the consumer based on an erroneous premise that authorization for a particular transaction was received during a telemarketing telephone conversation. Unlike the presently employed approach of acquiring all of a consumer's billing information from a third party, the lock-and-key consumer billing data protection system "locks" companies out of a consumer's account until the consumer takes the proactive step of reciting the missing billing information—the "key"—to a sales agent over the telephone. This advantage becomes even more important in light of the fact that many sales agents employed by telemarketers receive a substantial amount of their compensation from sales commissions. Lock-and-key consumer billing data protection combats this compensation scheme's incentive to maximize the amount of claimed sales in situations where a consumer's acceptance is ambiguous or even non-existent.

Another advantage of lock-and-key consumer billing data protection is that it eliminates the need for consumers to recite their entire credit or debit card number over the telephone to possibly untrustworthy sales agents employed by legitimate telemarketers or to fraudulent persons posing as telemarketers. Although individual sales agents learn part of a consumer's billing information—the "key"—which they enter into the telemarketing system, they are never furnished with the partial billing information already stored in the telemarketing database. As a result, the sales agents also are "locked" out of consumers' accounts. In an alternate embodiment, the telemarketer and seller are also denied access to the partial billing information, and thus are also "locked" out of the consumer's account.

Yet another advantage of lock-and-key consumer billing data protection is that its methodology adheres to the U.S. Federal Trade Commission's (FTC) Telemarketing Sales Rule ("TSR") regulations regarding consumer protection, even including the currently proposed amendments to the TSR. Under the lock-and-key consumer billing data protection, this is accomplished by requiring consumers to proactively "reach into their wallets" and recite to a sales agent a portion of their credit or debit card number—the "key."

Further features and advantages of the invention as well as the structure and operation of various embodiments of lock-and-key consumer billing data protection for telemarketing are described in detail below with reference to the accompanying drawings.

BRIEF DESCRIPTION OF THE FIGURES

The features and advantages of the present lock-and-key consumer billing data protection system will become more apparent from the detailed description set forth below when taken in conjunction with the drawings in which like reference numbers indicate identical or functionally similar elements. Additionally, the left-most digit of a reference number identifies the drawing in which the reference number first appears.

DETAILED DESCRIPTION OF THE PREFERRED EMBODIMENTS

Overview

Figure 1:
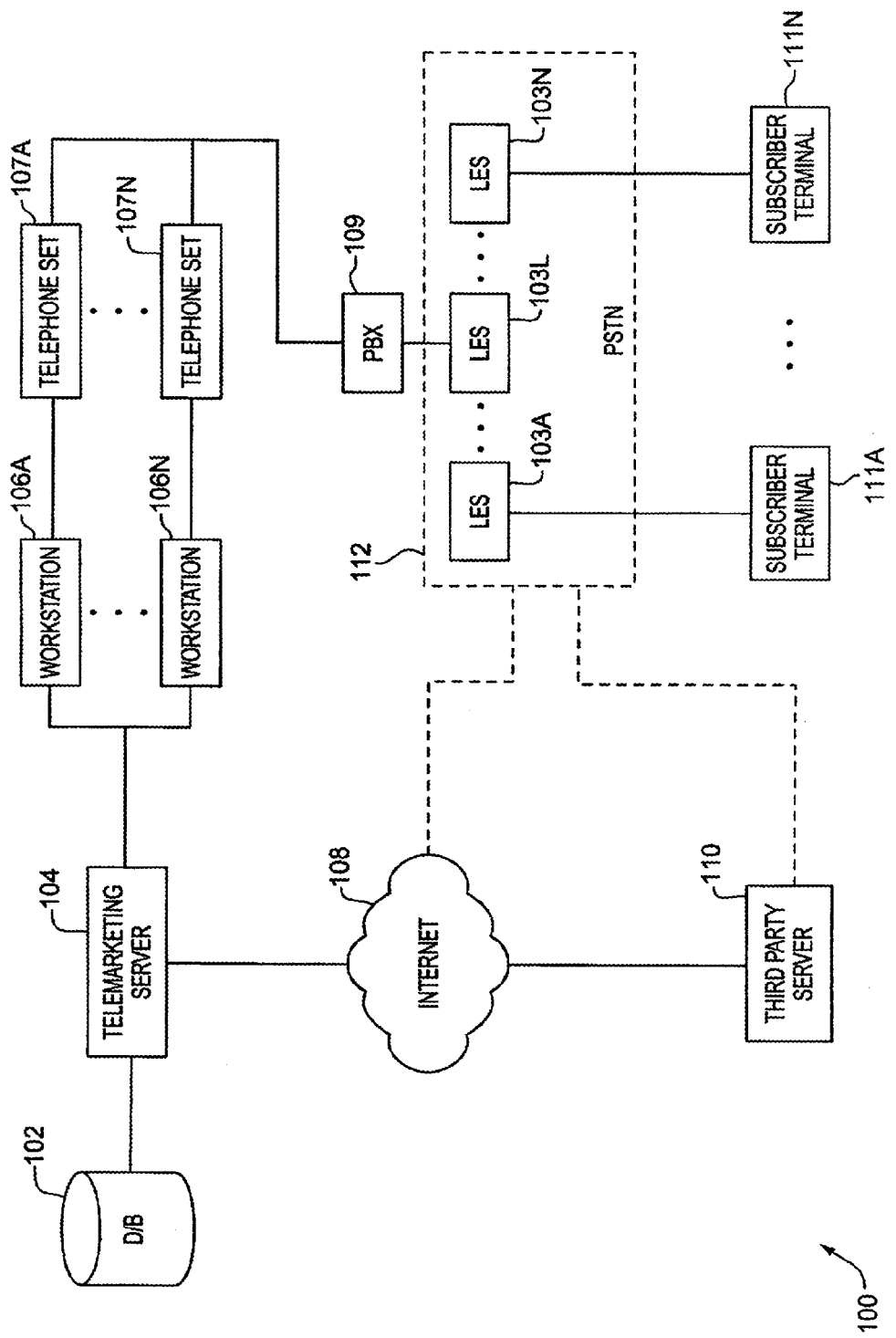
FIG. 1 is a block diagram illustrating the architecture of a lock-and-key consumer billing data protection system.

The present lock-and-key consumer billing data protection system relates to providing a "lock-and-key" consumer billing data protection capability to telemarketing systems. In an embodiment, a telemarketing entity (i.e., a telemarketer) selling particular good(s) and/or service(s) acquires a list of consumers (e.g., from a third-party company). This list identifies consumers who have recently purchased other products and/or services.

Such consumer lists transferred from the third-party contain only partial billing information (p alphanumeric characters of the m+p alphanumeric character customer billing information) for each consumer. That is, the partial billing information comprises a predetermined subset of data from the consumer's billing data, and fails to include the entirety of the billing data. One such example is a string of consecutive digits of the consumer's account number. Because complete billing information is needed to access a consumer's account, the system of the present lock-and-key consumer billing data protection system "locks" out the telemarketer, the seller, and even an entity hired to perform billing operations for such purchases from accessing the consumer's account.

When a consumer is called by a sales agent and takes a proactive step to unambiguously order the offered product(s) and/or service(s), the lock-and-key consumer billing data protection system requires that the consumers provide only certain alphanumeric characters from their charge, credit or debit cards—the "key"—in order to authorize the purchase. The provided key is then received by the sales agent and entered into the system. This is done without allowing the sales agent access to the consumer's partial billing information previously stored in the telemarketing system. The telemarketer, seller or company hired to perform billing operations, however, now has all of the consumer's billing information and, as a result, can access that consumers account.

Lock-and-key consumer billing data protection empowers consumers with the ability to buy products and services over the telephone while controlling access to their account and eliminating the need to recite all of their billing information over the telephone. Thus, lock-and-key consumer billing data protection guards against consumers being billed for products or services whose purchase they did not, nor intend to, authorize by requiring consumers to take the affirmative, proactive step of communicating part of their billing information to a sales agent in order to authorize a purchase. At the same time, lock-and-key consumer billing data protection guards against untrustworthy sales agents employed by legitimate telemarketers and/or fraudulent persons posing as legitimate telemarketers by denying these individuals access to all of a consumer's billing information.

The present lock-and-key consumer billing data protection system is described in terms of the above example. This is for convenience only and is not intended to limit the application of the present lock-and-key consumer billing data protection system. In fact, after reading the following description, it will be apparent to one skilled in the relevant art(s) how to implement the lock-and-key consumer billing data protection system in alternative embodiments (e.g., inbound telemarketing upsells, other types of commerce, etc.). For example, the lock-and-key consumer billing data protection capability described herein may be provided to an outbound telemarketing system in which a sales agent may contact consumers on-line (i.e., on the Internet) via instant messaging and the like, or where the sales agent is actually an automated, computer Voice Response Unit (VRU) or an Interactive Voice Response (IVR) unit. Another variation is where the complete customer billing information is provided to the telemarketer or the seller, or the company hired to perform billing operations, but cannot be viewed until the key retrieved from the customer is input into the telemarketing server and matched with the stored customer billing information.

GLOSSARY

Below are definitions of terms used herein. In the event that a term defined herein has a more common meaning or usage, the definition provided herein should be taken as the intended meaning.

"Acquirer" means a business organization, financial institution, or an agent of a business organization or financial institution that has authority from an organization that operates or licenses a credit card system to authorize sellers to accept, transmit, or process payment by credit card through the credit card system for money, goods or services, or anything else of value.

"Billing information" means the minimum data needed in order to charge or otherwise gain access to a consumer's account, such as a credit card, checking, savings, share or similar account, utility bill, mortgage loan account or debit card. In most instances, such minimum information is a set of alphanumeric characters, such as the typical sixteen-digit credit card account number.

"Credit card" means any debit, charge or credit card (whether private label or bank issued), or plate, coupon book or other credit device existing for the purpose of obtaining money, property, labor, or services on credit.

"Consumer" means any person who is or may be required to pay for goods, services or a charitable contribution offered or solicited through telemarketing.

"Consumer identification information" means the data used to contact a consumer (e.g., name, telephone number, address, etc.).

"Outbound telephone call" means any telephone call to induce the purchase of goods or services or to solicit a charitable contribution, when such telephone call is: initiated by a telemarketer; transferred to a telemarketer other than the original telemarketer; or involves a single telemarketer soliciting on behalf of more than one seller or charitable organization.

"Seller" means any person who incurs the obligation to a consumer to provide, or to have others provide, goods or services to the consumer in exchange for consideration from the consumers account.

"Telemarketer" means any person who, in connection with telemarketing, initiates or receives telephone calls to or from a consumer. Further, the terms "user," "telemarketer," "telemarketing company," "entity," and the plural form of these terms are used interchangeably throughout herein to refer to those who would access, use, and/or benefit from the lock-and-key consumer billing data protection capability provided to telemarketing systems as described herein.

"Telemarketing" means a plan, program or campaign which is conducted to induce the purchase of goods or services or a charitable contribution, by use of one or more telephones.

Lock-and-Key System

FIG. 1 is a block diagram that illustrates the architecture of a lock-and-key consumer billing data protection system 100. FIG. 1 highlights the connectivity among the various components of consumer billing data protection system 100.

Consumer billing data protection system 100 includes a repository database 102. Database 102, in an embodiment, is a computer running database management server software with physical media which acts as a central store for all information within consumer billing data protection system 100. That is, database 102 stores the consumer lists received by the telemarketing entity including the records containing consumers' identification information, the partial (or complete) billing information and possibly any collected demographic information.

In an alternate embodiment, database 102 would only store records containing consumers' contact and demographic information. That is, a seller engaging a telemarketer to perform telemarketing on its behalf would retain the partial billing information (except for the name of the credit card) for added consumer protection from possibly untrustworthy telemarketers.

Returning to FIG. 1, a telemarketing server 104 is the data processor of consumer billing data protection system 100, and is connected to database 102. Telemarketing server 104 allocates, distributes and provides certain data stored in database 102 to a plurality of workstations 106 (shown in FIG. 1 as workstations 106a-106n) used by a plurality of sales agents employed by the telemarketer. In an embodiment, telemarketing server 104 provides workstations 106 with graphical user interface (GUI) "front-end" screens to present certain data in the consumer records (one at a time) during the telemarketing process.

Each of the plurality of sales agents is also equipped with a telephone station set 107 (shown in FIG. 1 as 107a-107n) or their associated workstation 106 is capable of originating outgoing telephone calls. Assuming for the purpose of the description herein that the sales agents are equipped with telephone station sets 107, a Private Branch eXchange (PBX) 109 functions to interconnect the telephone station sets 107 via trunks with a Local Exchange System (LES) 103k. Local Exchange System 103k is part of the Public Switched Telephone Network (PSTN) 112. This allows the sales agents to originate calls to identified consumers in a well-known fashion.

The consumers are typically equipped with one or more of: a personal computer, hand held computing device, telephone station set or other subscriber communication device, collectively termed "subscriber terminal equipment" 111 herein (and shown in FIG. 1 as 111a-111n). Each consumer's subscriber terminal equipment 111 is generally served by PSTN 112 which consists of an inter-exchange carrier network (IXC) 113 that interconnects a plurality of Local Exchange Systems 103 (shown in FIG. 1 as LES 103a-103n), such as Local Exchange System 103k, each serving a plurality of subscriber terminal equipments 111 under control of an associated call processor. The physical connection that supports this communication connection is typically effected from each consumer's subscriber terminal equipment 111 through one of the Local Exchange Systems 103 of PSTN 112 (as shown in FIG. 1).

Returning to telemarketing server 104, it also allows consumer billing data protection system 100 to receive the consumer lists from third-party companies. That is, a plurality of servers 110 belonging to third-party companies may be authorized to access consumer billing data protection system 100 via the public, global Internet 108. (FIG. 1, however, shows only one third-party server 110 for ease of explanation herein.) Such third-party servers would then transfer consumer records to consumer billing data protection system 100 for storage onto database 102 under the control (i.e., authorization, scheduling, validation, etc.) of telemarketing server 102.

In an alternate embodiment, third-party servers 110 would access consumer billing data protection system 100 via a dial-in line over the PSTN 112, rather than the global Internet 108. In another alternate embodiment, components 102-106 of the consumer billing data protection system 100 are connected and communicate via a wide or local area network (WAN or LAN) running a secure communications protocol (e.g., secure sockets layer (SSL)).

While one database (i.e., database 102) is shown in FIG. 1 for ease of explanation herein, consumer billing data protection system 100 may utilize one or more databases physically located on one or more computers, which may or may not be the same as telemarketing server 104. Further, in an alternate embodiment, database 102 may be mirrored for fault tolerance.

Lock-and-Key Process

Figure 2:
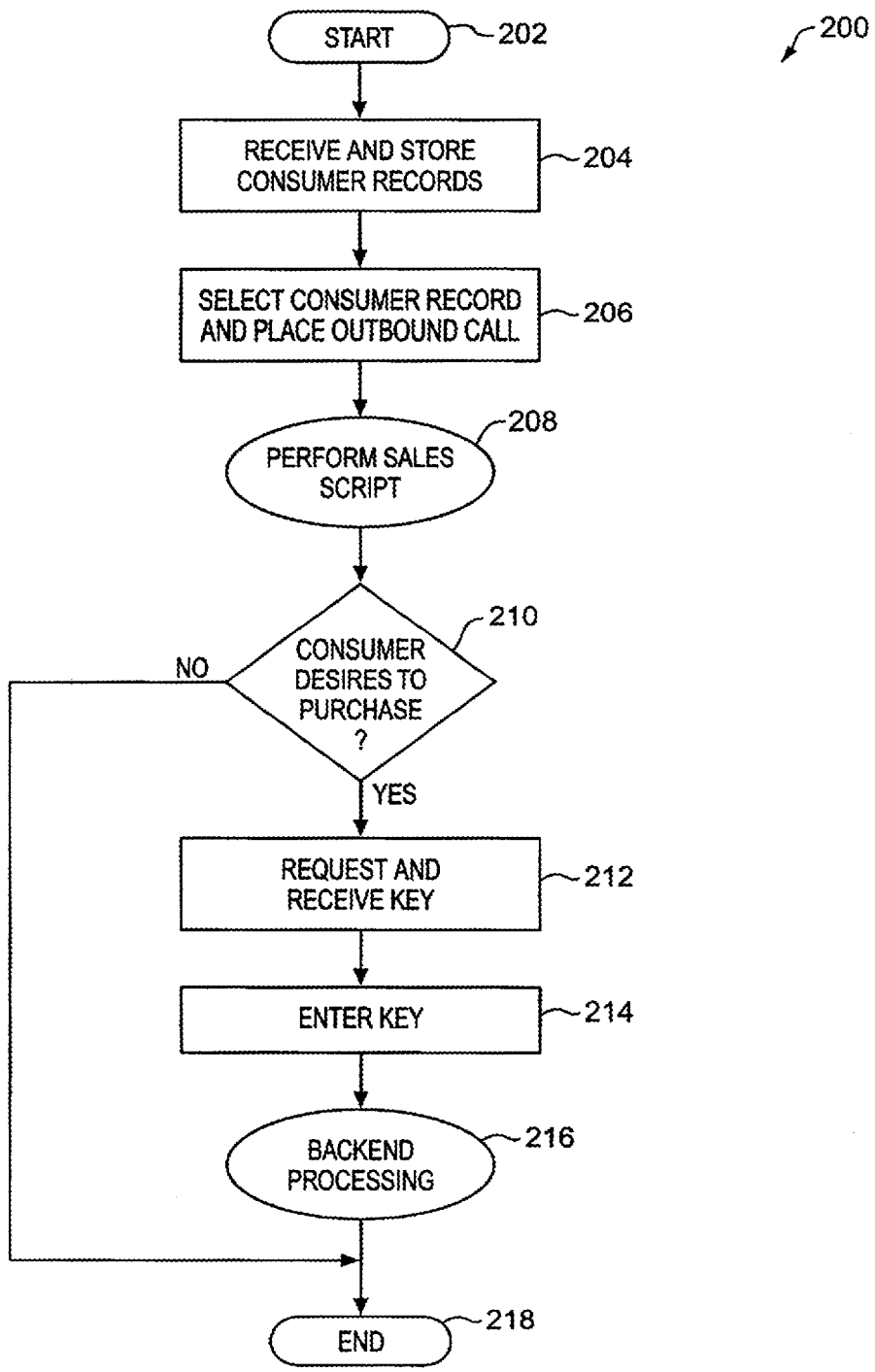
FIG. 2 is a flow chart depicting the operation of a lock-and-key consumer billing data protection system.

FIG. 2 is a flow chart depicting the operation of the lock-and-key consumer billing data protection system 100. Billing data protection process 200, which illustrates the order-entry functionality, consumer security and other advantages of consumer billing data protection system 100, begins at step 202, with control passing immediately to step 204.

In step 204, a telemarketer receives, either directly or indirectly via a seller engaging the telemarketer, data comprising a list of consumers (in the form of database records) from a third-party company, which data is stored in telemarketing server 104. In an embodiment, such consumers would have previously purchased good(s) and/or service(s) related to those being currently offered by the telemarketer. In an alternate embodiment, the list of consumers may be created or acquired "in-house" by the telemarketer or seller (e.g., by a research department or an affiliated entity). In either event, the received consumer list typically contains only partial billing information (e.g., the name of the credit card and a portion of the credit card number) for each consumer. Telemarketing server 104 receives such consumer records from a third-party company's server 110 over the Internet 108 or a dial-in line. In alternate embodiments, telemarketing server 104 receives and loads such consumer records from removable storage media. Telemarketing server 104 then stores the list in database 102 and "locks" out the sales agents employed by the telemarketer from a portion of the consumer account information by not allowing access to this partial billing information. The method of restricting access to a portion of a data record on a processor is well known and not described in detail herein.

In an alternate embodiment, the received consumer list does not contain any partial billing information, except for the name of the credit card and/or expiration date. That is, a seller engaging the telemarketer to perform telemarketing on its behalf may choose to retain the partial billing information. While this does not allow the telemarketer to perform certain functions (e.g., billing information verification), it allows the seller to provide for added consumer protection from possibly untrustworthy telemarketers.

In an alternate embodiment, the received consumer list contains all of the billing information (either encrypted or unencrypted). That is, a seller engaging the telemarketer to perform telemarketing on its behalf may choose to provide the billing information, with the billing information being inaccessible (e.g., encrypted) absent the provision of the key by the consumer. This allows the telemarketer to perform certain functions (e.g., billing information verification). In another embodiment, only an entity (e.g., acquirer) hired by the seller to perform billing would receive the consumer list containing all of the billing information (either encrypted or unencrypted). That is, the billing information would be inaccessible (e.g., encrypted) absent the provision of the key by the consumer. In yet another embodiment, the seller would receive the consumer list containing all of the billing information (either encrypted or unencrypted). That is, the billing information would be inaccessible (e.g., encrypted) absent the provision of the key by the consumer.

Returning to process 200, in step 206, a sales agent identifies a particular consumer to call from the list received in step 204. Among the sales agents employed by the telemarketer, the identification and assignment of consumers from the list may be done by telemarketing server 104 in several fashions, including: randomly, alphabetically, geographically or the like. During step 206, the sales agent is allowed access to and presented with the consumer's identification information and possible demographic information on their workstation 106. Telemarketing server 104, however, assures that the sales agent does not have access to the consumer's partial billing information stored within database 102. In step 208, the sales agent utilizes telephone station set 107 to place an outbound telephone call via PSTN 112 to a consumer using subscriber terminal equipment 111. The sales agent typically performs an assigned "sales script," that is provided by the seller, once in communication with the customer.

In step 210, consumer billing data protection system 100 (telemarketing server 104) determines whether the consumer desires to purchase the offered product(s) and/or service(s). This determination is made by receiving an input (keystroke, mouse click, touch screen event or the like) from the sales agent made on their workstation 106. If the determination of step 210 is negative, billing data protection process 200 then ends as indicated by step 218. Billing data protection process 200 may then be repeated for the next consumer from the received list assigned to that particular sales agent. Otherwise, if the determination of step 210 is positive, the billing data protection process 200 proceeds to step 212.

In step 212, the sales agent requests that the consumer provide (by voice, keypad entries, etc.) the "key"—the missing billing information which the seller needs in order to access the consumer's account and bill them for the purchased good(s) and/or services(s). In an embodiment of lock-and-key consumer billing data protection, the key is m alphanumeric characters of the m+p alphanumeric character billing information where consumer billing data protection system 100 has previously stored the p alphanumeric characters in step 204 in telemarketing server 104. In an alternate embodiment, the key is the missing m alphanumeric characters of the m+p alphanumeric character credit card billing information in addition to other data unique to the consumer or the consumer's account (e.g., the Authenticated Content Signing [ACS] code commonly located on credit cards), but not part of the billing information needed to access consumers' account.

In step 214, the sales agent enters the key into consumer billing data protection system 100 using their workstation 106. Thus, the consumer always holds the key to their own account. Only if the consumer proactively locates their credit card and supplies the missing billing information to the sales agent will the seller have the "key" to access the consumer's locked account.

In step 216, after the missing billing information has been entered into consumer billing data protection system 100 by the sales agent, the telemarketer and/or seller then performs its normal "back-end" processing to handle, ship—if applicable—and then bill the consumer for the purchased good(s) and/or service(s). The performance of step 216 by consumer billing data protection system 100 (i.e., telemarketing server 104) does not involve the telemarketer's sales agents ever having access to consumer's complete billing information on the display provided by telemarketing server 104 to workstation 106. That is, the sales agent receives only the missing information (i.e., the key) in step 212. Therefore, lock-and-key consumer billing data protection guards against untrustworthy sales agents employed by legitimate telemarketers and/or fraudulent persons posing as legitimate telemarketers. Billing data protection process 200 then ends as indicated by step 218.

Lock-and-Key Information Transfer

Figure 3:
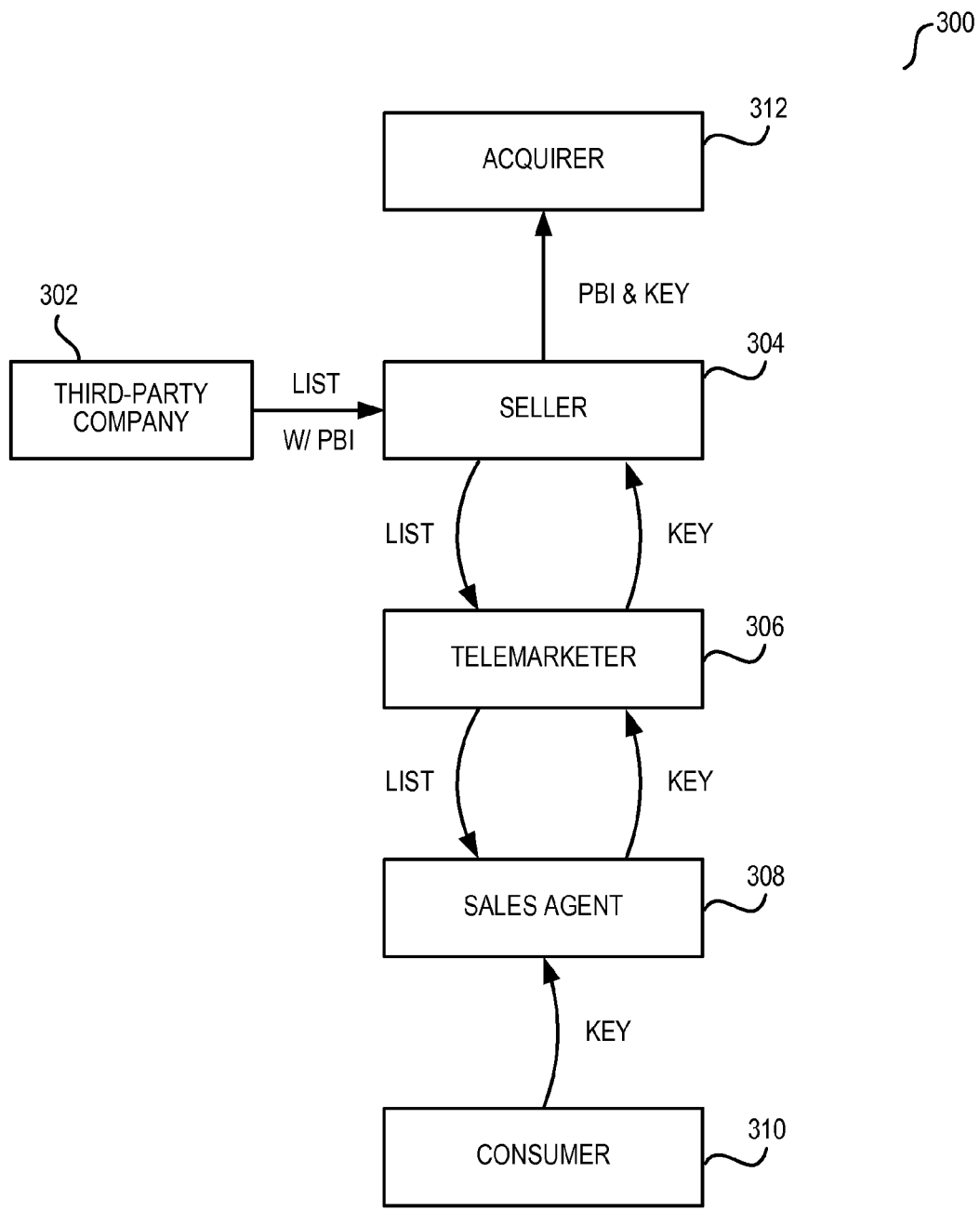
FIG. 3 is a diagram representing an information transfer flow within a lock-and-key consumer billing data protection system.

FIG. 3 is a diagram representing an information transfer flow 300 within the lock-and-key consumer billing data protection system 100. Information transfer flow 300 further highlights the consumer security provided during, say, process 200, of consumer billing data protection system 100.

Information transfer flow 300 begins with a third-party company 302 transferring a list of consumers to a seller 304. Included in these consumer records are only partial billing information (shown as "PBI" in FIG. 3) for each consumer. The seller 304 then transfers the list of consumers (and possibly the names of the credit cards), but not the partial billing information, to a telemarketer 306 hired to initiate and/or receive telephone calls to or from the consumers in order to induce the purchase of goods or services offered by the seller 304. In turn, the telemarketer 306 apportions the list of consumers among its several sales agents 308. This gives the sales agents 308 access to only the consumers' identification information and possible demographic information.

Next, a particular sales agent 308, for example, places an outbound telephone call to a consumer 310. If, after hearing the sales script, consumer 310 desires to purchase the offered product(s) and/or service(s), sales agent 308 requests that consumer 310 provide the "key"—the missing billing information. Once the consumer proactively provides to key to sales agent 308, this signals their acceptance of the sales script's offer. The key is then passed back to telemarketer 306 and eventually to seller 304. Seller 304 now has the "key" necessary to pass on to an acquirer 312. This allows the acquirer 312 to "unlock" the consumer's account by now having access to the complete billing information in order to bill them for the purchased good(s) and/or service(s).

Information flow 300, as presented above, does not involve sales agent 308 ever having access to the complete billing information of consumer 310. Therefore, the lock-and-key consumer billing data protection guards against untrustworthy sales agents employed by legitimate telemarketers and fraudulent persons posing as legitimate telemarketers.

Seller 304 and telemarketer 306, in an alternate embodiment, may be one and the same entity. In yet another embodiment, seller 304 and acquirer 312 may be one and the same entity. Seller 304 may transfer both the list and lock to telemarketer 306 to allow telemarketer 306 to, for example, provide billing information verification. In such an embodiment, telemarketer 306 would may still make the consumer's billing information inaccessible to sales agents 308 to guard against untrustworthy sales agents and fraudulent persons posing as legitimate telemarketers. In such an embodiment, however, should telemarketer 306 allow sales agents 308 to access the partial billing information, this only guards against fraudulent persons posing as legitimate telemarketers, but not against untrustworthy sales agents.

It should be understood that information transfer flow 300, which highlights the functionality and other advantages of consumer billing data protection system 100, is presented for example purposes only. The present invention is sufficiently flexible and configurable such that information may flow in ways other than that shown in FIG. 3.

Example Implementations

Figure 4:
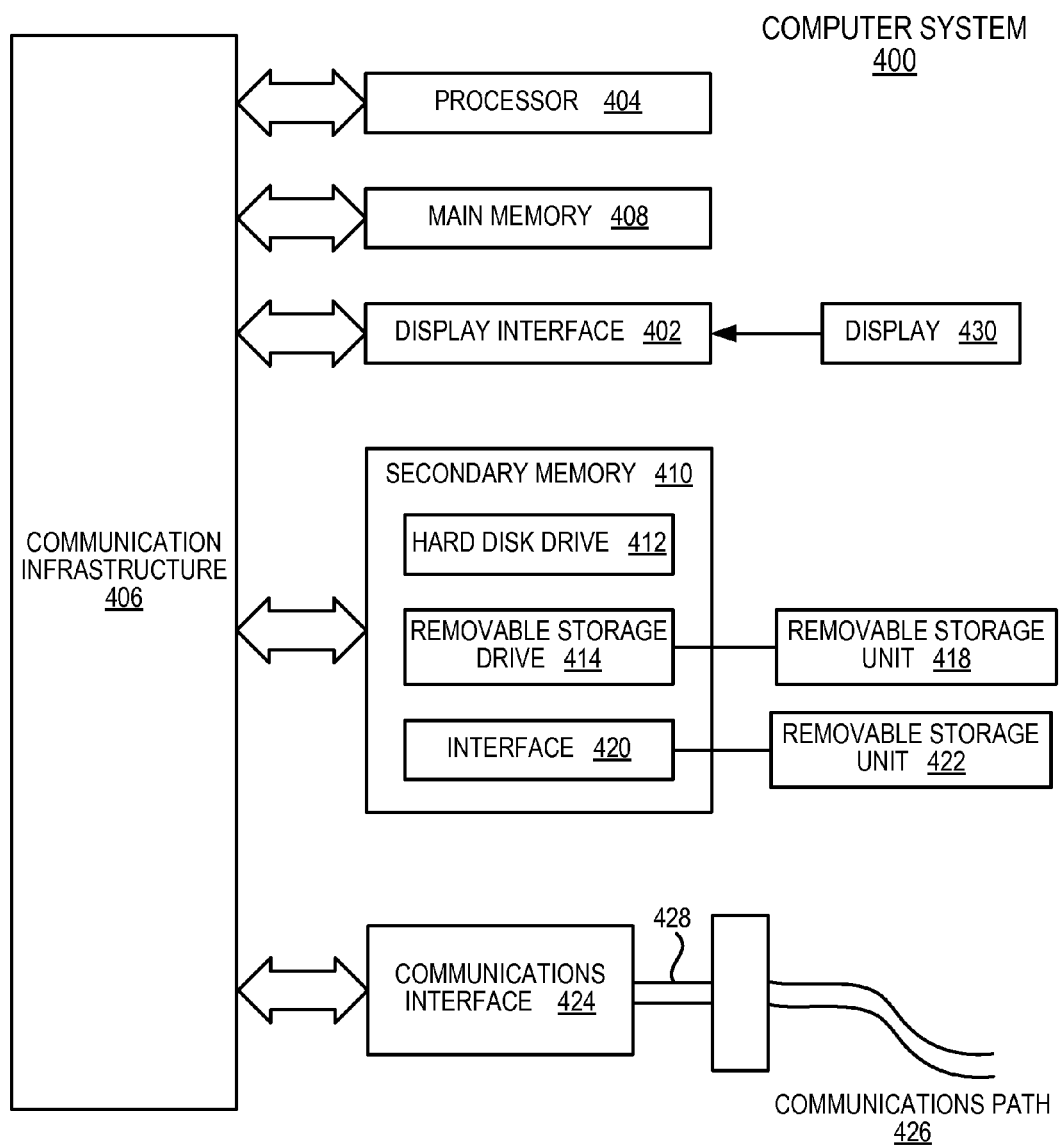
FIG. 4 is a block diagram of an exemplary computer system useful for implementing the present lock-and-key consumer billing data protection system.

The present consumer billing data protection system 100, billing data protection process 200, information transfer flow 300, or any parts thereof may be implemented using hardware, software or a combination thereof and may be implemented in one or more computer systems or other processing systems. In fact, in one embodiment, the lock-and-key consumer billing data protection system is directed toward one or more computer systems capable of carrying out the functionality described herein. An example of a computer system 400 is shown in FIG. 4. The computer system 400 includes one or more processors, such as processor 404. The processor 404 is connected to a communication infrastructure 406 (e.g., a communications bus, crossover bar, or network). Various software embodiments are described in terms of this exemplary computer system.

Computer system 400 can include a display interface 402 that forwards graphics, text, and other data from the communication infrastructure 406 (or from a frame buffer not shown) for display on the display unit 430.

Computer system 400 also includes a main memory 408, preferably random access memory (RAM), and may also include a secondary memory 410. The secondary memory 410 may include, for example, a hard disk drive 412 and/or a removable storage drive 414, representing a floppy disk drive, a magnetic tape drive, an optical disk drive, etc. The removable storage drive 414 reads from and/or writes to a removable storage unit 418 in a well known manner. Removable storage unit 418, represents a floppy disk, magnetic tape, optical disk, etc. which is read by and written to by removable storage drive 414. As will be appreciated, the removable storage unit 418 includes a computer usable storage medium having stored therein computer software and/or data.

In alternative embodiments, secondary memory 410 may include other similar means for allowing computer programs or other instructions to be loaded into computer system 400. Such means may include, for example, a removable storage unit 422 and an interface 420. Examples of such may include a program cartridge and cartridge interface (such as that found in video game devices), a removable memory chip (such as an EPROM, Flash ROM, EEPROM, Mask Programmed ROM or PROM) and associated socket, and other removable storage units 422 and interfaces 420 which allow software and data to be transferred from the removable storage unit 422 to computer system 400.

Computer system 400 may also include a communications interface 424. Communications interface 424 allows software and data to be transferred between computer system 400 and external devices. Examples of communications interface 424 may include a modem, a network interface (such as an Ethernet card), a communications port, a PCMCIA slot and card, etc. Software and data transferred via communications interface 424 are in the form of signals 428 which may be electronic, electromagnetic, optical or other signals capable of being received by communications interface 424. These signals 428 are provided to communications interface 424 via a communications path (i.e., channel) 426. This channel 426 carries signals 428 and may be implemented using wire or cable, fiber optics, a telephone line, a cellular telephone link, an RF link and other communications channels.

In this document, the terms "computer program medium" and "computer usable medium" are used to generally refer to media such as removable storage drive 414, a hard disk installed in hard disk drive 412, and signals 428. These computer program products are means for providing software to computer system 400. The invention is directed to such computer program products.

Application programs (also called computer control logic) are stored in main memory 408 and/or secondary memory 410. Application programs may also be received via communications interface 424. Such application programs, when executed, enable the computer system 400 to perform the features of lock-and-key consumer billing data protection as discussed herein. In particular, the computer programs, when executed, enable the processor 404 to perform the features of lock-and-key consumer billing data protection. Accordingly, such computer programs represent controllers of the computer system 400.

In an embodiment where the lock-and-key consumer billing data protection system is implemented using software, the software may be stored in a computer program product and loaded into computer system 400 using removable storage drive 414, hard drive 412 or communications interface 424. The control logic (software), when executed by the processor 404, causes the processor 404 to perform the functions of the invention as described herein.

In another embodiment, the lock-and-key consumer billing data protection system is implemented primarily in hardware using, for example, hardware components such as application specific integrated circuits (ASICs), or permanent storage means which may be altered, such as Flash ROM. Implementation of the hardware state machine so as to perform the functions described herein will be apparent to persons skilled in the relevant art(s).

CONCLUSION

While various embodiments of the present lock-and-key consumer billing data protection system have been described above, it should be understood that they have been presented by way of example, and not limitation. It will be apparent to persons skilled in the relevant art(s) that various changes in form and detail can be made therein without departing from the spirit and scope of the invention. Thus, the present lock-and-key consumer billing data protection system should not be limited by any of the above-described exemplary embodiments, but should be defined only in accordance with the following claims and their equivalents.

What is claimed:

1. A method for providing a consumer billing data protection capability, the method comprising:
    storing in a computer system a plurality of consumer records, each of which includes consumer identification information and partial billing information, wherein the partial billing information comprises a predetermined set of p alphanumeric characters of a billing information of said consumer; wherein the partial billing information is less than a data required by a financial institution separate from the computer system to debit funds from a consumer's account at the financial institution, and wherein a remaining m alphanumeric characters of the billing information of said consumer are not stored in the computer system;
    sending an electronic communication offer to a consumer's communication device corresponding to the consumer identification information stored in one of the plurality of consumer records;
    processing at said computer system an order received from said consumer's communication device, comprising:
        receiving a key from said consumer's communication device, said key comprising at least the remaining m alphanumeric characters of the billing information of said consumer, wherein said m+p alphanumeric characters are equal to the data required by the financial institution to debit funds from the consumer's account at the financial institution; and
        billing for an order using the partial billing information stored in said consumer record and the remainder of the data provided by said key.

2. The method of claim 1, wherein sending an electronic communication offer to a consumer's communication device comprises:
    generating said electronic communication offer as an electronic mail message for transmission to said consumer's communication device via at least a portion of the Internet.

3. The method of claim 1, wherein sending an electronic communication offer to a consumer's communication device comprises:
    generating said electronic communication offer as an instant message for transmission to said consumer's communication device via at least a portion of the Internet.

4. The method of claim 1, wherein sending an electronic communication offer to a consumer's communication device comprises:
    generating said electronic communication offer as a text message for transmission to said consumer's communication device via at least a portion of a wireless mobile communications network.

5. The method of claim 1, wherein said key includes an Authenticated Content Signing (ACS) code of a credit card.

6. The method of claim 1, further comprising:
    retrieving said consumer identification information stored in one of the plurality of consumer records; and
    generating said electronic communication offer that contains a message that offers a product or service for sale by a marketer.

7. The method of claim 1, further comprising:
    receiving an electronic communication comprising an inquiry from a consumer's communication device;

retrieving said consumer identification information stored in one of the plurality of consumer records corresponding to the identity of said inquiry transmitting consumer; and generating said offer electronic communication that contains a message that offers a product or service for sale by a marketer.

8. A method for providing a consumer billing data protection capability in an electronic marketing system, the method comprising:

storing in a computer system a plurality of consumer records, each of which includes consumer identification information and a set of p alphanumeric characters of an entire credit card number of a credit card of said consumer, wherein the set of p alphanumeric characters of the credit card number are less than the entire credit card number, and wherein a remaining m alphanumeric characters of the entire credit card number are not stored in the computer system;

enabling a marketer, utilizing the electronic marketing system, to access said consumer identification information stored in one of said plurality of consumer records;

enabling said marketer, utilizing the electronic marketing system, to send an electronic communication offer to a consumer's communication device corresponding to said consumer identification information stored in said one of said plurality of consumer records;

processing at said computer system an order received from a consumer's communication device, comprising:
receiving a return electronic communication containing a key from said consumer's communication device, said key comprising at least the remaining m alphanumeric characters of the credit card number, wherein said m+p alphanumeric characters are combinable to form the entire credit card number; and
billing for an order using the credit card number.

9. The method of claim 8, wherein said marketer has no access to the entire credit card number of the credit card of said consumer.

10. The method of claim 8, wherein at least one of said electronic communication offer, and said return electronic communication is an electronic mail message transmitted via at least a portion of the Internet.

11. The method of claim 8, wherein at least one of said electronic communication offer and said return electronic communication is an instant message transmitted via at least a portion of the Internet.

12. The method of claim 8, wherein at least one of said electronic communication offer and said return electronic communication is a text message transmitted via at least a portion of a wireless mobile communications network.

13. The method of claim 8, further comprising:
retrieving said consumer identification information stored in one of the plurality of consumer records; and
generating said electronic communication offer that contains a message that offers a product or service for sale by said marketer.

14. The method of claim 8, further comprising:
receiving an electronic communication comprising an inquiry from a consumer's communication device;
retrieving said consumer identification information stored in one of the plurality of consumer records corresponding to the identity of said inquiry transmitting consumer; and
generating said electronic communication offer that contains a message that offers a product or service for sale by said marketer.

15. A method for providing a consumer billing data protection capability, the method comprising:
storing in a computer system a plurality of consumer records, each of which includes consumer identification information and partial billing information, wherein the partial billing information comprises a predetermined set of alphanumeric characters of a billing information of said consumer; wherein the partial billing information is less than a data required by a financial institution separate from the computer system to debit funds from a consumer's account at the financial institution, and wherein a remaining m alphanumeric characters of the billing information of said consumer are not stored in the computer system;
receiving a key, comprising at least the remaining m alphanumeric characters of the billing information of said consumer, wherein said m+p alphanumeric characters are combinable to form the sufficient data usable to charge a consumer's account; and billing for an order using the partial billing information stored in said consumer record and said key.

16. The method of claim 15, further comprising:
enabling a marketer utilizing the electronic marketing system to access the consumer identification information stored in said one of the plurality of consumer records.

17. The method of claim 15, wherein said key includes an Authenticated Content Signing (ACS) code of a credit card.

18. The method of claim 15, further comprising:
retrieving said consumer identification information stored in one of the plurality of consumer records;
generating said electronic communication offer that contains a message that offers a product or service for sale by said marketer; and
sending an electronic communication offer to a consumer's communication device corresponding to the consumer identification information stored in one of the plurality of consumer records.

19. The method of claim 15, further comprising:
receiving an electronic communication comprising an inquiry from a consumer's communication device;
retrieving said consumer identification information stored in one of the plurality of consumer records corresponding to the identity of said inquiry transmitting consumer;
generating said electronic communication offer that contains a message that offers a product or service for sale by said marketer; and
sending an electronic communication offer to a consumer's communication device corresponding to the consumer identification information stored in one of the plurality of consumer records.

20. A method for providing a consumer billing data protection capability in an electronic marketing system, the method comprising:
storing a plurality of consumer records, each of which includes consumer identification information and partial billing information, wherein the partial billing information comprises a predetermined set of p alphanumeric characters of a billing information of said consumer, wherein the partial billing information is less than a sufficient data usable to charge a consumer's account, and wherein a remaining m alphanumeric characters of the billing information of said consumer are not available to the electronic marketing system to complete the stored partial billing information until provided by said consumer;

enabling a marketer, utilizing the electronic marketing system, to access said consumer identification information stored in one of said plurality of consumer records;

receiving a key, comprising the remaining m alphanumeric characters of the billing information of said consumer, wherein said m+p alphanumeric characters are equal to the sufficient data usable to charge a consumer's account; and billing for an order using said partial billing information and said key.

21. The method of claim 20, wherein said marketer has no access to the billing information of said consumer.

22. The method of claim 1, wherein the data required by the financial institution separate from the computer system to debit funds from a consumer's account at the financial institution comprises a credit card number, a checking account number, a savings account number, a share account number, a utility account number, a mortgage loan account number, or a debit card number.

23. The method of claim 20, wherein the consumer's account is selected from the group consisting of a credit card account, a checking account, a savings account, a share account, a utility account, a mortgage loan account, and a debit card account.

* * * * *

UNITED STATES PATENT AND TRADEMARK OFFICE
CERTIFICATE OF CORRECTION

| | | |
|---|---|---|
| PATENT NO. | : 8,521,647 B2 | Page 1 of 1 |
| APPLICATION NO. | : 10/107863 | |
| DATED | : August 27, 2013 | |
| INVENTOR(S) | : Rothfarb | |

It is certified that error appears in the above-identified patent and that said Letters Patent is hereby corrected as shown below:

On the Title Page

Item (73), under "Assignee", in Column 1, Line 1,
delete "Nebard Software Foundation L.L.C.," and
insert -- Nebarb Software Foundation L.L.C., --, therefor.

In the Specification

In Column 7, Lines 27-28, delete "telemarketing server 102." and
insert -- telemarketing server 104. --, therefor.

In Column 9, Line 1, delete "services(s)." and insert -- service(s). --, therefor.

In the Claims

In Column 13, Line 41, in Claim 10, delete "offer," and insert -- offer --, therefor.

In Column 15, Line 21, in Claim 23, delete "consisting of" and
insert -- consisting of: --, therefor.

Signed and Sealed this
Eighth Day of July, 2014

Michelle K. Lee
*Deputy Director of the United States Patent and Trademark Office*